United States Patent
Gautier et al.

(10) Patent No.: US 6,206,329 B1
(45) Date of Patent: *Mar. 27, 2001

(54) PROCESS AND DEVICE FOR THE CONTROL OF THE RUDDER OF AN AIRCRAFT

(76) Inventors: Jean-Pierre Gautier, 1, rue Malcousinat, 31000 Toulouse; Jean-Marc Ortega, 33, rue Théophile Gautier, 31700 Blagnac, both of (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/003,890

(22) Filed: Jan. 7, 1998

(30) Foreign Application Priority Data

Sep. 15, 1995 (FR) .................................................. 95 10847
Mar. 14, 1997 (FR) .................................................. 97 03100

(51) Int. Cl.[7] .................................................. B64C 13/36
(52) U.S. Cl. ........................ 244/221; 244/226; 244/227; 244/228
(58) Field of Search .................................. 244/221, 226, 244/227, 224, 228, 75 R; 91/391, 459, 453

(56) References Cited

U.S. PATENT DOCUMENTS

| | | | |
|---|---|---|---|
| 3,912,202 | * | 10/1975 | Jenkins . |
| 4,533,097 | * | 8/1985 | Aldrich . |
| 4,759,515 | * | 7/1988 | Carl . |
| 4,964,599 | * | 10/1990 | Farineau . |
| 5,074,495 | * | 12/1991 | Raymond . |
| 5,109,672 | * | 5/1992 | Chenoweth et al. . |
| 5,791,596 | * | 8/1998 | Gautier et al. . |

* cited by examiner

Primary Examiner—Peter M. Poon
Assistant Examiner—Tien Dinh
(74) Attorney, Agent, or Firm—Burns Doane Swecker, & Mathis L.L.P.

(57) ABSTRACT

A device for the control of a control surface of an aircraft has at least two actuators (110, 112, 114), each having at least one electric control input (111a, 113a, 115a). At least one of the actuators (115), called the mixed actuator, also has a mechanical control input (115b), and an electric control system for the actuators is able to occupy a state corresponding to a fault of an engine in which at least two of the actuators simultaneously operate the control surface and a state corresponding to an electric fault, in which the mixed actuator (115) operates the control surface from the mechanical control input.

6 Claims, 6 Drawing Sheets

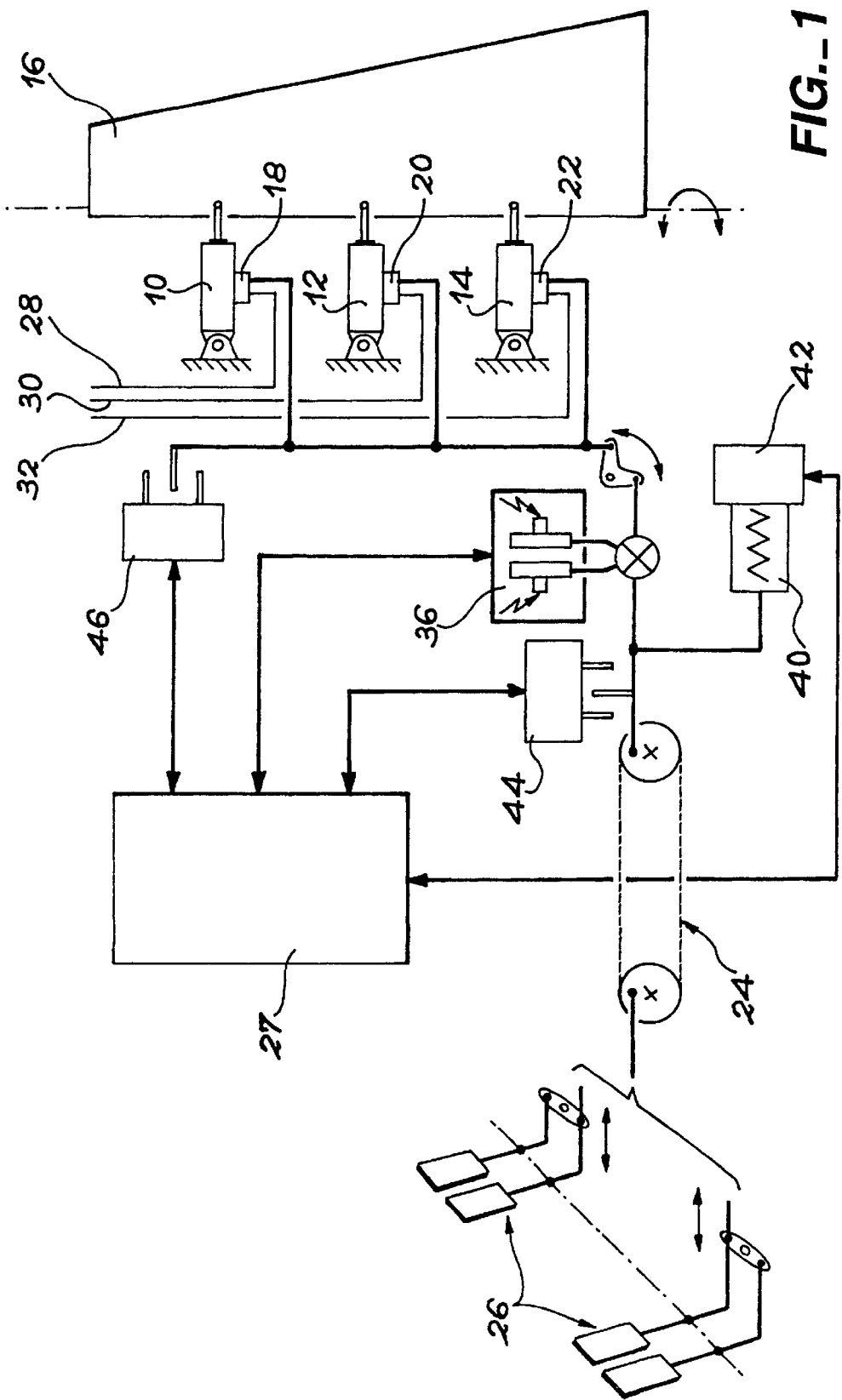
FIG._1
PRIOR ART

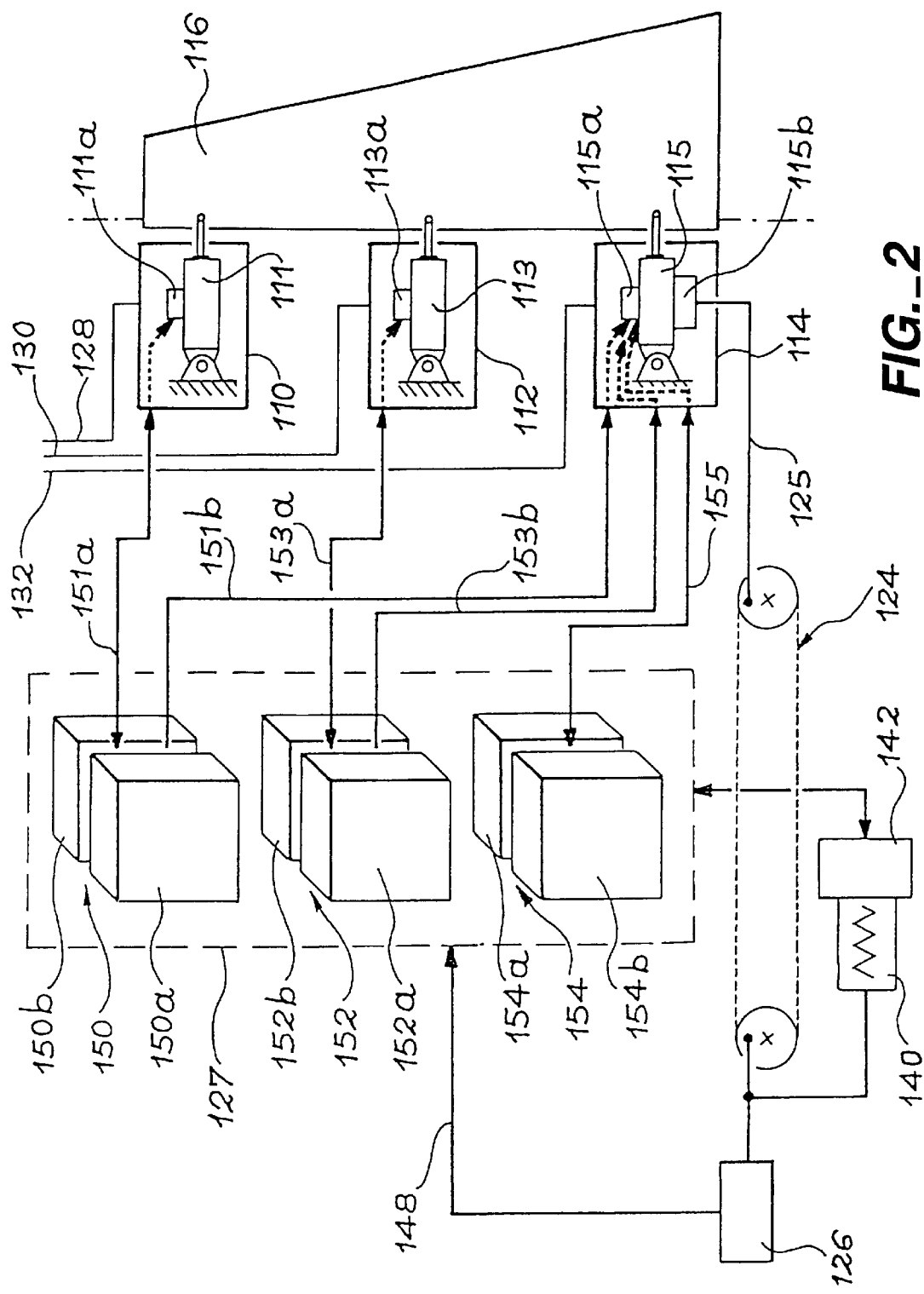
FIG._2

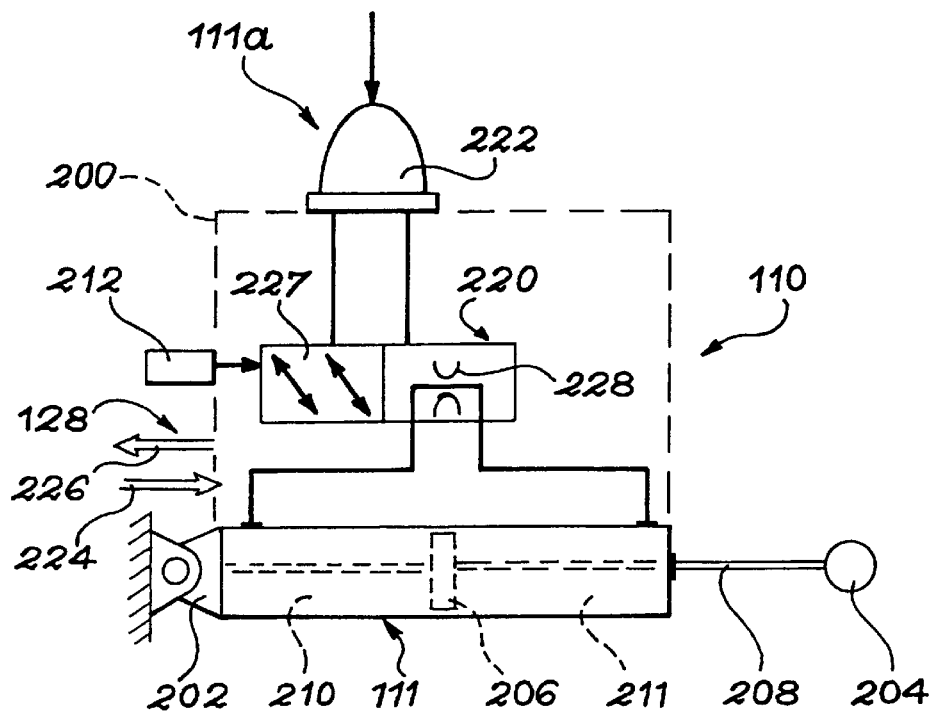
FIG._3
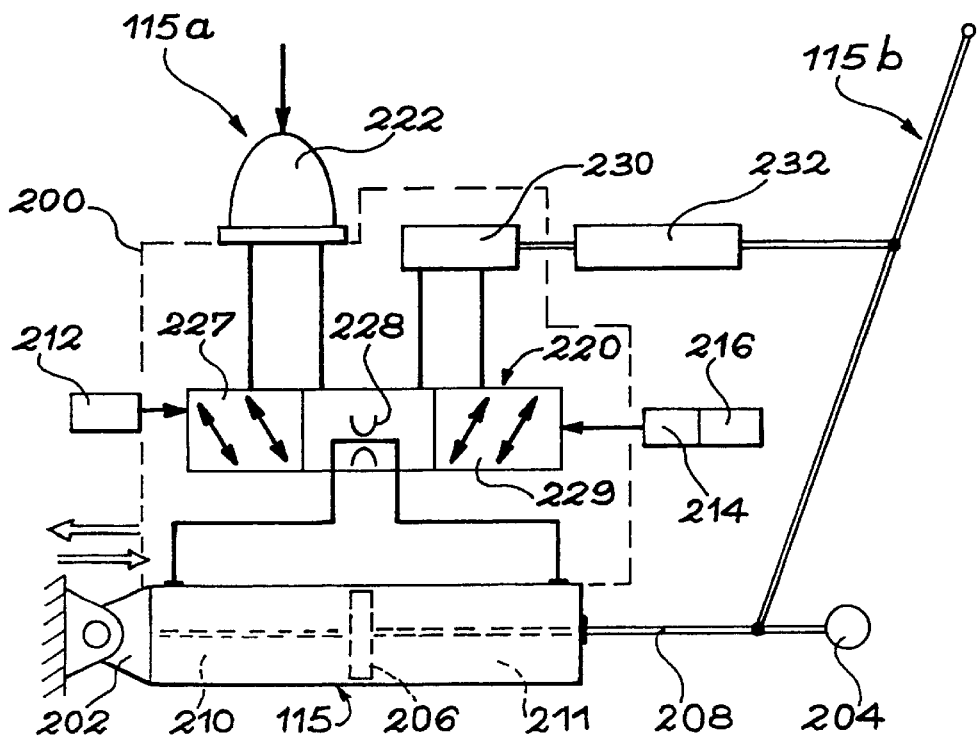
FIG._4

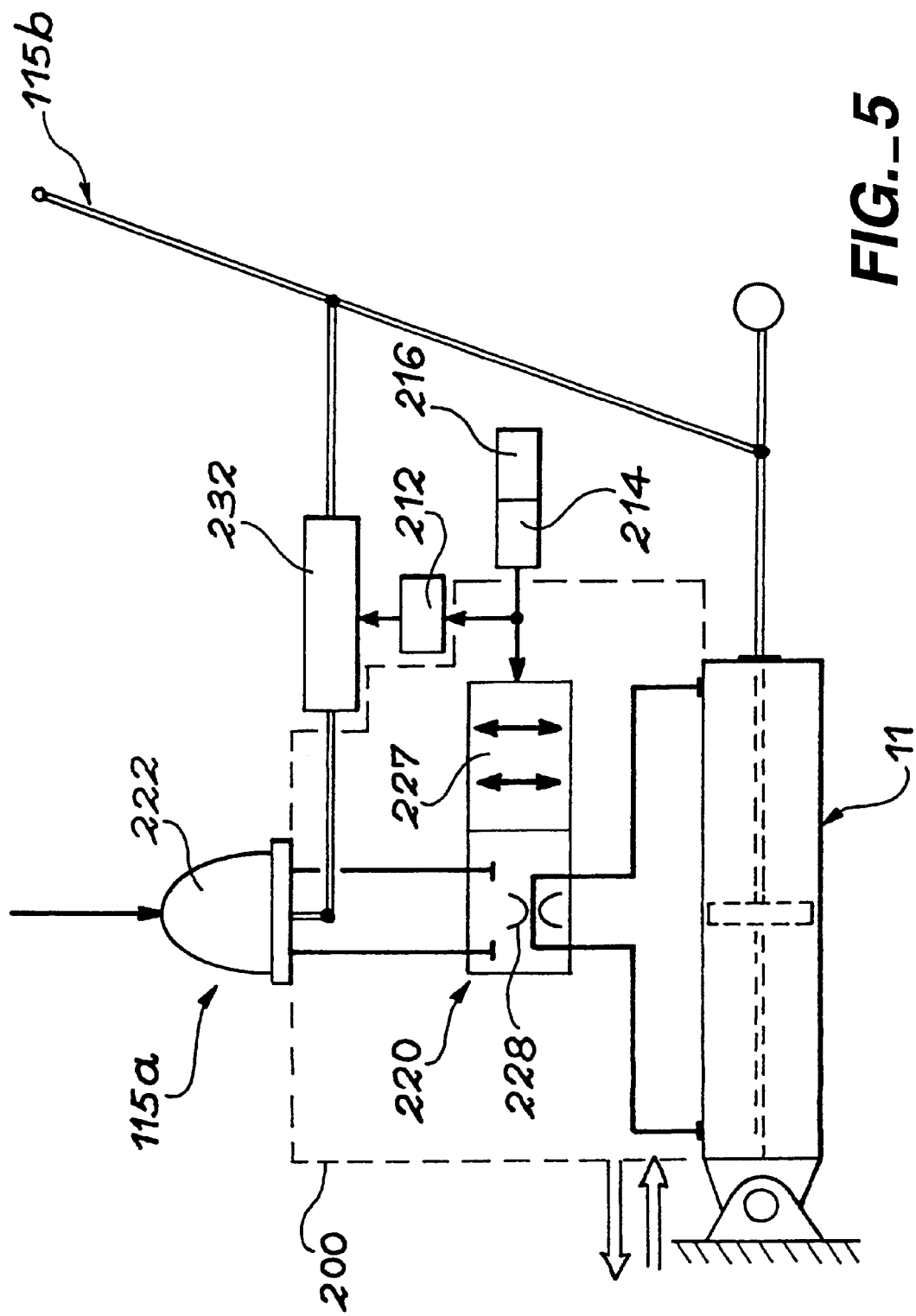
FIG._5

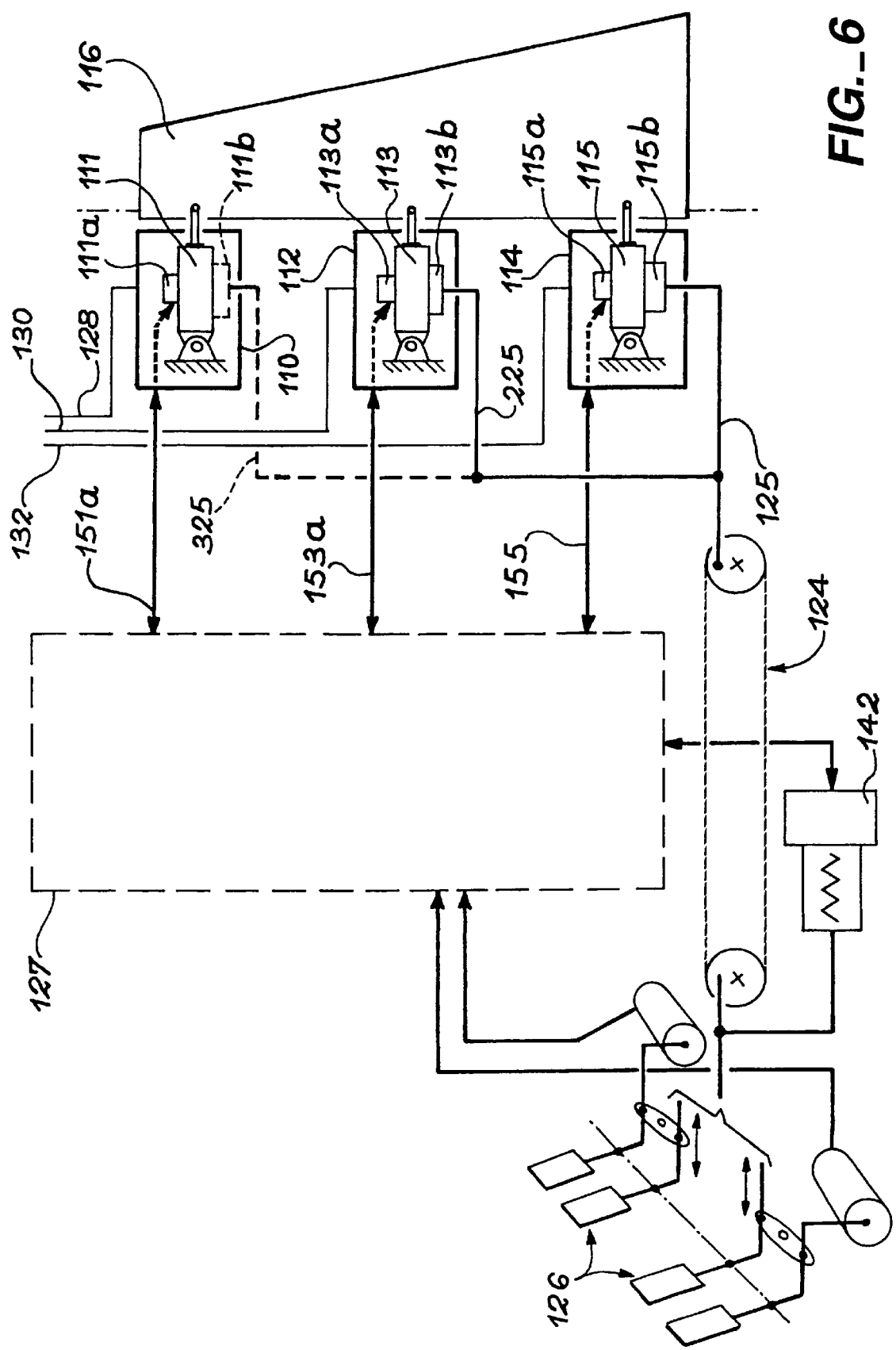
FIG._6

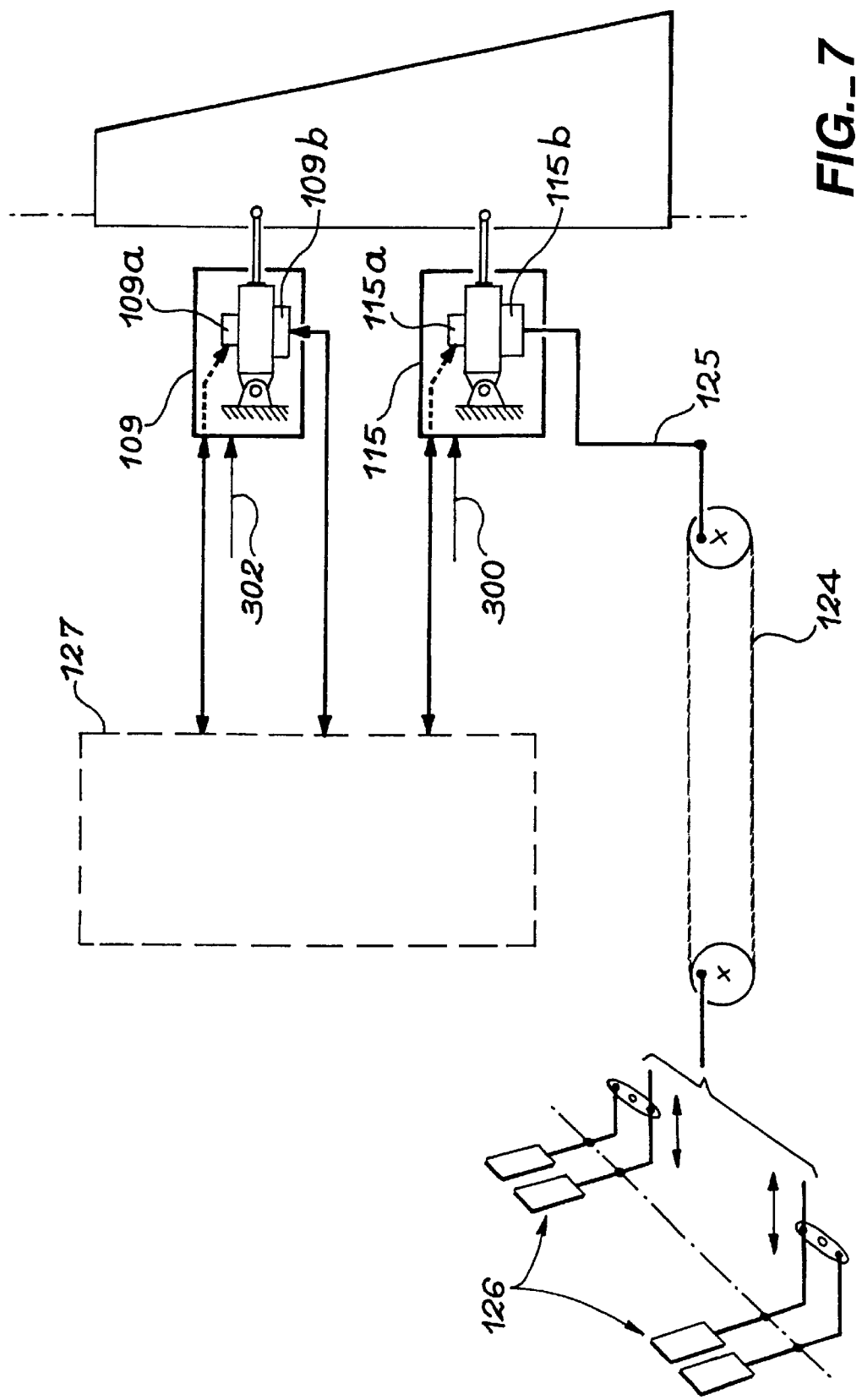
FIG._7

PROCESS AND DEVICE FOR THE CONTROL OF THE RUDDER OF AN AIRCRAFT

DESCRIPTION

1. Technical Field of the Invention

The present invention relates to a process and a device for the control of a control surface of an aircraft.

The invention more particularly relates to an electric control device intended for transport aircraft simultaneously satisfying the requirements of precision, reliability and lightness existing for such equipment.

2. Prior Art

FIG. 1 diagrammatically illustrates a known control device of the type presently equipping AIRBUS aircraft A320 and A340. This device comprises an arrangement of three actuators 10, 12, 14 for operating a rudder 16. The three actuators are of the hydromechanical type and each has a mechanical control input 18, 20, 22. Their control is ensured by a linkage 24, which acts on mechanical control inputs 18, 20, 22 and which can be operated from pedals 26 (rudder bar). In addition, each actuator 10, 12, 14 is supplied by a different hydraulic circuit 28, 30, 32 supplying the energy necessary for the movement of the rudder 16.

The control device also incorporates a computing or calculating unit 27 able to develop control orders, instructions or commands such as e.g. yaw damping commands. These commands are added to the control commands from the pedals 26 by means of a system of electro-hydraulic jacks 36. The addition of the control commands from the computing unit to those from the pedals takes place mechanically and in such a way that the movements of the jacks 36 are not retransmitted to the pedals.

A device 40 for giving an artificial sensation of force is provided for restoring to the pedals a force which is a function of their deflection, thereby facilitating control. This device 40 incorporates a so-called trim actuator 42 controlled by the computing unit 27, so that the positioning of the rudder 16 in a predetermined position known as the zero force position when the pedals 26 are released by the pilot.

Devices 44 and 46 controlled by the computing unit 27 serve to limit the movement of the pedals and/or the rudder.

With a control device according to FIG. 1, the three actuators 10, 12 and 14 are simultaneously pressurized from hydraulic circuits 28, 30, 32 and the actuators are controlled in parallel for manipulating the rudder 16.

As indicated hereinbefore, the electro-hydraulic jacks 36 exert control commands and in particular yaw damping commands by means of a mechanical linkage in order to control the mechanical input of the actuators. Thus, friction and any deformation of the mechanical transmission system unfavourably influences the precision of the controls.

A second known type of rudder control device makes it possible to overcome this disadvantage by using three electrical input-equipped actuators. Electric control signals are directly applied to the input of the actuators. Thus, in the absence of a mechanical control transmission system, it is possible to operate the rudder with a significantly increased precision. However, such a device has no mechanical backup in the case of an electric fault leading to the failure of all the controls.

Document (1) FR-A-2 603 865 describes an aircraft rudder control device equipped with two electro-hydraulic actuators with an electrical input and a hydromechanical actuator with a mechanical input. In this device, each actuator is supplied by its own hydraulic circuit. The electro-hydraulic actuators receive electric control commands supplied by computers associated therewith.

Moreover, only one of the three actuators is operated at once in order to manipulate the rudder. According to a predetermined hierarchy, in the case of a failure of the control system of one of the actuators, the control system of the next priority actuator is initiated. The control system with the hydromechanical actuator has the lowest triggering or initiating priority. It therefore constitutes a mechanical backup in the case of an electric failure to the other control systems.

In the known rudder control devices, the pressurizing pumps of the hydraulic circuit supplying the actuator are driven or supplied with energy by the aircraft engines. For safety reasons, the pumps of the hydraulic circuits of the different actuators are driven by at least one engine. In general, one of the hydraulic circuits can be driven by at least two engines.

A failure or stoppage of one of the engines can lead to a pressure loss in the hydraulic circuit associated therewith and consequently the corresponding actuator is rendered inoperative.

The failure of one of the engines, particularly in the case where the aircraft has its engines fixed to the wings, can lead not only to a pressure loss in the hydraulic circuit associated therewith, but more particularly leads to a thrust unbalance, the thrust no longer being symmetrical. This unbalance can be compensated by manipulating the rudder in an appropriate manner.

When the rudder control device has three actuators with an electric input or three actuators with a mechanical input controlled in parallel, the manipulation of the rudder and consequently the balancing of the equipment remain possible by operating the two actuators not affected by the pressure drop of the hydraulic circuit associated with the faulty engine.

With a device according to document (1), in the case of a failure of an engine leading to a pressure drop in a hydraulic circuit of an electro-hydraulic actuator, the manipulation of the rudder takes place either with the electro-hydraulic actuator remaining in the operating state, or optionally with the hydromechanical actuator.

However, when it is necessary to compensate a thrust unbalance of the engines, particularly in the take-off phase, maximum loads are exerted on the rudder and said loads condition the size of the actuators to be used.

Thus, as it is not possible to simultaneously operate the rudder with a hydromechanical actuator and an electro-hydraulic actuator on equipment equipped with a rudder control device according to document (1), the actuators and associated hydraulic circuits must be dimensioned in such a way that each actuator is able to exert on the rudder the maximum forces or loads necessary for compensating an asymmetrical thrust in the case of a failure of one of the engines.

Such a measure leads to an increase in the size and consequently the weight of the actuators and the corresponding hydraulic circuits.

The aforementioned problem not only arises for the rudder, but also for the other control surfaces of the aircraft. The other control surfaces of an aircraft such as the inclination or pitch control surfaces (elevators) are certainly less sensitive than the rudder to thrust instability resulting from an engine failure, but can also be subject to occasional high loads.

The control surfaceS of an aircraft are exposed to high loads, particularly in the case of turbulence or when the aircraft performs a manoeuvre such as e.g. a vertical acceleration, a turn or a pull-out.

An aircraft state in which the control surfaces are subject to such loads is designated hereinafter by the term << manoeuvre state >>.

Thus, in order to cope with a << manoeuvre state >>, the actuators must also be overdimensioned.

Thus, one object of the invention is to propose an aircraft control surface control device, which has a reduced weight compared with the device of document (1) and which permits the manipulation of the rudder or the other control surfaces even in the case of engine failure leading to an aircraft thrust unbalance, or in case of a << manoeuvre state >>.

Another object is to propose a device remaining operational even in the case of a failure of the electric servocontrol systems.

Another object of the invention is to propose a control device permitting the manipulation of the control surfaces with a significantly increased precision compared with mechanical control-based devices.

A further object of the invention is to propose an improved control process for the control surfaces satisfying severe reliability and safety requirements.

DESCRIPTION OF THE INVENTION

In order to achieve these objects, the invention more specifically relates to a device for the control of the rudder of an aircraft equipped with at least two engines, having at least two actuators, each having at least one electric control input, and an electric control system for the actuators able to occupy a first state corresponding to normal operation of the engines in which at least one of the actuators operates the rudder. According to the invention, at least one of the actuators, called the mixed actuator, also has a mechanical control input, and the electric control system for the actuator is able to occupy a second state corresponding to an engine failure, in which at least two of the actuators simultaneously operate the rudder, and a third state corresponding to an electric failure, in which the mixed actuator, controlled from the mechanical control input, operates the rudder.

In the same way, the invention also relates to a device for the control of other control surfaces and in particular inclination or pitch control surfaces of an aircraft, having at least two actuators, each actuator having at least one electric control input. The device comprises an electric control system for the actuators, able to occupy a first state, called normal flight, in which at least one of the actuators is controlled in order to actuate the control surface. According to the invention, at least one of the actuators, called the mixed actuator, also has a mechanical control input, and the electrical control system of the actuators is able to occupy a second state, called the manoeuvre state, in which at least two of the actuators are controlled in order to simultaneously actuate the control surface. The electric control system is also able to occupy a third state, called the electric control breakdown state, in which the mixed actuator is controlled from the mechanical control input to actuate the control surface.

In the sense of the present invention, normal flight state is a state where there is an absence of an inclination or pitch control, or a state in which the inclination or pitch controls correspond to very small amplitude control surface movements, for normal path corrections.

In the normal flight state, the control surfaces occupy a neutral position or perform movements which have a small deflection compared with their neutral position.

The manoeuvre state is a state in which the aircraft performs a manoeuvre such as e.g. a vertical acceleration, a turn or a pull-out, during which the control surface or surfaces in question are subject to a high load. The manoeuvre state can also correspond to a state in which the aircraft performs one of the aforementioned manoeuvres, but is e.g. exposed to turbulence increasing the loads exerted on the control surfaces.

As a result of the invention, a control surface can be simultaneously operated with two actuators, particularly in the case of an engine failure. It is therefore necessary to apply to the control surface the maximum forces required for balancing the flight, i.e. compensating asymmetrical thrust of the engines or compensating a high load exerted on the control surfaces.

The device according to the invention also offers the security of a mechanical control in the case of an electrical failure.

According to an aspect of the invention, the electric control system of the actuators can comprise a calculating or computing unit respectively associated with each actuator.

Each computing unit can be equipped with one, but preferably several redundant computers. These computers develop control commands or orders, such as e.g. yaw damping commands directed towards the actuators. Thus, the computers control the operating modes of the actuators explained hereinafter.

According to another aspect of the invention, the electric input-equipped actuators can respectively have a hydraulic jack with two chambers and a servovalve connected to a hydraulic circuit for supplying the chambers with a hydraulic fluid flow which is a function of an electric control from the computing unit associated with the actuator.

According to an aspect of the invention, the actuators having an electric control input and no mechanical control can operate according to two modes.

A first mode is the so-called "electrically active" mode. A solenoid valve of the actuator is activated by a computer responsible for the control of the actuator and the chambers of the jack are linked with the servovalve. The latter then supplies a hydraulic fluid flow, which is a function of electric commands supplied by a computer of the electric control system.

A second mode is the so-called damped mode. In this operating mode, the solenoid valve is deactivated by the computer responsible for the control and the actuator jack chambers are mutually linked across a restrictor. The restrictor brakes the passage of the hydraulic fluid from one chamber of the jack to the other and thus makes it possible to damp the movements of the control surface (rudder, for example). It is possible to provide a damped mode with several degrees of damping. A slight damping makes it possible to only very slightly affect the performance characteristics of the operation of the control surface, in the case of "manoeuvre state". In the case of a failure or normal aircraft operation, a greater damping can be envisaged for the actuators not participating in the operation of the control surface.

According to an embodiment of the invention, the device can have three actuators with an electric input, whereof at least one is a mixed actuator. The actuators having a mixed input can also operate according to the "electrically active"

and "damped" mode. They can also operate according to a "mechanically active" mode. According to a first variant of the actuator with mixed control, the latter has a first solenoid valve controlled by the computing unit respectively associated therewith, the first solenoid valve being able to occupy an activated state corresponding to the "electrically active" mode of the jack, in which the chambers of the jack are linked with the servovalve, and a deactivated state. The mixed actuator also has a second and a third solenoid valves respectively controlled by computing units associated with the two others actuators of the device and able to alternately occupy an activated state and a deactivated state, the chambers of the jack of the mixed actuator being linked with one another in a so-called "damped" operating mode of the jack, when the first solenoid valve occupies a deactivated state and at least one of the second and third solenoid valves occupies an activated state and the chambers of the jack of the mixed actuator are linked with a distributor connected to the mechanical input of the actuator in a so-called "mechanically active" mode, when the first, second and third solenoid valves occupy a deactivated state.

When the jack chambers are linked with the servovalve, the latter supplies them with a hydraulic fluid flow which is a function of electric control commands developed by the electric control system and applied to the servo-valve. In the same way, when the jack chambers are linked with the distributor, the latter supplies them with a hydraulic fluid flow, which is a function of mechanical commands applied to the mechanical control input.

According to another embodiment of the mixed actuator, the latter can also incorporate a first, a second and a third solenoid valves respectively controlled by a computing unit associated with said mixed actuator and by computing units associated with two others actuators of the device, each able to alternately occupy an activated state and a deactivated state, the actuator operating according to a "damped" mode, in which the jack chambers are linked, when at least one of the second and third solenoid valves is in an activated state. The actuator operating according to the "electrically active" mode, in which the jack chambers are linked with the servovalve and in which it is controlled by means of the electric control input, when the first solenoid valve is activated and the second and third solenoid valves are deactivated. The actuator operates in a so-called "mechanically active" mode, in which the jack chambers are linked with the servo-valve and in which the actuator is controlled by means of the mechanical control input, when the first, second and third solenoid valves are in a deactivated state.

According to an aspect of the invention, each hydraulic circuit can incorporate a pressurization system driven by at least one engine.

The device can also have at least one actuator with two electric control inputs, said actuator having a first electric input for controlling a servovalve and a second electric input for controlling an integrated, autonomous, hydraulic generating system.

This hydraulic generating system integrated in the actuator can supply a variable hydraulic fluid flow to the chambers of the jack, as a function of electric control commands developed by the control system, so as to operate the rudder.

Such a hydraulic generating system equips the hydrostatic actuators. It makes it possible to free the operation of the actuator from that of an engine.

Thus, when a hydraulic circuit is pressurized by a pump which is driven or supplied with energy by a single engine, the failure of said engine leads to a pressure drop on said circuit and renders the corresponding actuator inoperative. The hydrostatic actuators and actuators having two electric inputs, whereof one controls a hydraulic generating system of an autonomous nature, thus remain able to operate even in the case of an engine failure.

The invention also relates to a process for the control of a control system of the rudder of an aircraft equipped with at least two engines, comprising at least two actuators having an electric control input, whereof at least one, called the mixed actuator, also has a mechanical control input, and an electric control system for the actuators, according to which, for operating the rudder:

one of the actuators is electrically controlled in the case of normal operation of the engines, at least two actuators in an operational state are electrically and simultaneously controlled in the case of a failure of an engine and the mixed actuator is mechanically controlled in the case of a failure of the electric control system of the actuators.

The invention further relates to a process for controlling a control system of an aircraft inclination or pitch control surface, the control system comprising at least two actuators with an electric control input, whereof at least one, the mixed actuator, also has a mechanical control input, and the control system further comprising an electric control system for the actuators, wherein, for actuating the control surface, at least one of the actuators is electrically controlled in a normal flight state, at least two actuators can be electrically and simultaneously controlled in a manoeuvre state, and the mixed actuator is mechanically controlled in a breakdown state of the actuators electric control system.

Other features and advantages of the invention can be gathered from the following illustrative and non-limitative description relative to the attached drawings.

BRIEF DESCRIPTION OF THE DRAWINGS

FIG. 1, already described, is a simplified diagrammatic representation of a known, aircraft rudder control device.

FIG. 2 is a simplified diagrammatic representation of a control surface control device according to a first embodiment of the invention.

FIG. 3 is a simplified diagrammatic representation of a actuator having an electric control input able to equip the device of FIG. 2.

FIG. 4 is a simplified diagrammatic representation of a mixed actuator able to equip the device of FIG. 2.

FIG. 5 is a simplified diagrammatic representation of another type of mixed actuator able to equip the device of FIG. 2.

FIG. 6 is a simplified diagrammatic representation of a control surface control device according to a second embodiment of the invention.

FIG. 7 is a simplified diagrammatic representation of a control surface control device according to a third embodiment of the invention.

DESCRIPTION OF EMBODIMENTS OF THE INVENTION

In the following description, identical or similar components in the different drawings carry the same references in order to facilitate the understanding thereof.

FIG. 2 shows in simplified form a first embodiment of the rudder control device according to the invention, which has three actuators 110, 112 and 114 equipped with jacks 111, 113 and 115 for manipulating a control surface 116. The actuators 110 and 112 have electric control inputs 111*a* and 113*a* and the actuator 114 is a mixed actuator having an electric control input 115*a* and a mechanical control input 115*b*. The actuators are of the "single body" type, i.e. each actuator is connected to a single hydraulic circuit and only has one jack.

The jack of each of the actuators is supplied by a different hydraulic circuit. The hydraulic circuits of jacks 111, 113 and 115 are partly shown and carry the references 128, 130 and 132.

The hydraulic circuits are equipped with not shown pressurization pumps driven or supplied with energy respectively by one or several different aircraft engines.

As a variant, one or more actuators can have their own internal hydraulic circuit and which is placed under pressure by an internal electric pump. In this case the energy supply to the actuators is electric and the hydraulic circuits 128, 130 and 132 are replaced by electric supply circuits.

An electric control system 127 for the actuators has three computing or calculating units 150, 152 and 154 for respectively controlling the actuators 110, 112 and 114. Each computing system can have a computer or a plurality of redundant computers, respectively 150*a*, 150*b*, 152*a*, 152*b*, 154*a*, 154*b*, operating in parallel in order to increase the reliability of the computing units.

The computing units 150, 152 and 154 are respectively connected to the actuators by electrical connections 151*a*, 153*a* and 155 shown in simplified form and in particular for the transmission of control signals to the electric control inputs 111*a*, 113*a* and 115*a*. These control signals integrate the instructions corresponding to the position of a control member 126, such as a lever or wheel installed on the flight deck. Thus, the hydraulic jacks which exist on the known devices similar to FIG. 1 (cf. Ref. 36), for introducing yaw damping control commands to the mechanical control system are superfluous.

Electrical connections 151*a*, 151*b*, 153*a*, 153*b* and 155 transmit signals controlling an operating mode of the actuators.

The position of the control member 126 (lever, wheel, pedal), detected by position sensors is electrically transmitted to the control system 127 by electrical connections 148.

For the rudder, the limitation of the movement of the control surface as a function of flight conditions can be implemented electrically in the computers. As a result of this feature, it is possible to simplify the mechanical control system by obviating mechanical movement limitation devices with respect to the pedals and/or rudder. A device for the artificial sensation of forces on the pedals can be installed, in this case, in the cockpit, near the pedals.

A mechanical linkage system 124 by means of a disengageable gear 125, makes it possible to directly apply the controls exerted on the pedals (or other control member) at the mechanical control input 115*b* of the actuator 115.

A device for the artificial sensation of forces and a zero force regulation actuator 142 controlled by means of the electric control system 127 are also provided for restoring to the control members a force which is a function of their deflection.

In the case of normal flight, the control commands are electrically transmitted to one of the actuators. For example, the computing unit 150 supplies control commands to the actuator 110. In the case of a failure of one of the engines, two actuators are simultaneously operated. When the failure of an engine or another break down leads to a hydraulic pressure drop in the hydraulic circuit of one of the actuators, e.g. actuator 110, the operation of the control surface is ensured by the two actuators 112, 114, whose hydraulic circuit is not pressurized from the faulty engine.

In the same way, in the normal flight state, a failure leading to the malfunction of one of the actuators leads to the control of another actuator able to operate.

According to a variant of the device of FIG. 2, one of the actuators having an electrical input 110, 112, e.g. the actuator 112 can be replaced by a hydrostatic actuator called an electro-hydrostatic actuator or EHA, which has an integrated, autonomous, hydraulic generating system. The external hydraulic circuit 130 is then eliminated, which lightens the device. In the case of an engine failure leading to a pressure drop in one of the hydraulic circuits 128 or 132, one of the actuators having an external hydraulic circuit 110 or 114 and the autonomous actuator 112 (EHA) remains for operating the rudder.

FIG. 3 diagrammatically shows the main components of a actuator having an electric control input also called the electro-hydraulic actuator. The actuator 110 has a jack 111 and a control unit 200 with an electric control input 111*a*.

The jack 111 has an end 202 connected to a fixed support connected to the not shown fin and an end 204 connected to the not shown control surface. A piston 206, integral with a piston rod 208, subdivides the jack cylinder into two chambers 210, 211.

A solenoid valve 212 connected electrically to a not shown computing unit associated with the actuator makes it possible to select a actuator operating mode.

When the solenoid valve is activated by an electric signal, a slide or slide valve 220 known as the "mode slide" is positioned so as to link the chambers 210, 211 to a servovalve 222, by means of a double passage portion 227 of the slide.

The servovalve 222, electrically connected to the computing unit, then supplies the jack 111 with a hydraulic fluid flow, which is a function of the commands developed by the computing unit. The actuator then operates in an already described, electrically active mode. The hydraulic fluid flow is supplied by a hydraulic circuit 128, whereof all that is shown is a high pressure inlet 224 and a low pressure outlet 226.

When the solenoid valve 212 is deactivated, in the absence of an electric signal, the mode slide valve 220 is positioned so as to isolate the chambers of the jack from the servovalve 222 and link together the chambers 210, 211 across a restrictor 228. This position, illustrated in FIG. 3, corresponds to the operation of the actuator according to the already described, damped mode.

FIG. 4 diagrammatically shows a mixed actuator, like the actuator 114 used in the control device illustrated in FIG. 2. Numerous components are identical to those of the actuator of FIG. 3. These components carry the same references and reference can be made in this connection to the description already given. In FIG. 4, the actuator jack, by analogy with FIG. 2, carries the reference 115 and the electric and mechanical control inputs respectively the references 115*a* and 115*b*.

The mode slide 220 of the mixed actuator can occupy three positions and is operated by three solenoid valves 212, 214 and 216, respectively controlled by the computing units 154, 152 and 150 shown in FIG. 2.

When the solenoid valve 212 is activated, the slide 220 occupies a position in which the chambers 210, 211 are linked with the servovalve 222 by means of a double passage portion 227 of the slide valve. The actuator then operates according to the aforementioned, electrically active mode.

When the solenoid 212 is deactivated and at least one of the solenoid valves 214 and 216 is activated, the mode slide occupies a position in which the chambers 210 and 211 are linked across a restrictor 228 for an operation according to the damped mode. This position corresponds to the slide position shown in FIG. 4.

When none of the solenoid valves 212, 214 and 216 is activated, the mode slide occupies a third position, in which the chambers 210 and 211 are linked with a distributor 230 via a double passage portion 229 of the slide. In this position, a clutch 232 is engaged and connects the distributor 230 to the mechanical control input 115b.

The distributor 230 then supplies the jack with a hydraulic fluid flow, which is a function of the mechanical control applied to the input 115b. The actuator operates according to the mechanically active mode. This mode is initiated by default in the case of an electrical failure, i.e. when none of the solenoid valves receives a signal from a computing unit.

For example and with reference to FIG. 2, it can be seen that in the case of a failure of the first electrical chain 150, 150a, 150b, 151a, 151b associated with the actuator 110, the solenoid valve 216 is deactivated. The second electrical chain 152, 152a, 152b, 153a, 153b associated with the actuator 112 is then activated for controlling the actuator 112.

In the case of an electrical failure of said second chain, the solenoid valve 214 is also deactivated. The third electrical chain 154, 154a, 154b, 155 is then activated for controlling the actuator 114.

Finally, in the case of an electrical fault to the three chains, the three solenoid valves 212, 214 and 216 are deactivated and the mechanical control of the mixed actuator is automatically activated.

In the case of normal operation of the control device, the clutch 232 is disengaged, which avoids commands such as yaw stabilization commands supplied by the computers from being mechanically retransmitted to the pedals. According to a variant, to ensure that commands are not retransmitted to the control members, it is also possible to equip the mechanical control input with a cam or spring rod system able to absorb the entire actuator travel.

FIG. 5 diagrammatically shows another type of mixed actuator usable in the device according to the invention. The actuator has a mode slide or slide valve 220 with only two positions. If at least one of the two solenoid valves 214, 216, respectively controlled by the computing units 152, 150 and visible in FIG. 2 are actuated, the mode slide is positioned in order to manually link the jack chambers 210, 211 via the restrictor 228 and the actuator operates according to the damped mode. The activation of the solenoid valve 212 also makes it possible to place the clutch 232 in a disengaged state, which makes the servovalve 222 independent of the mechanical control 115b.

When the solenoids 214 and 216 are deactivated, the mode slide 220 is positioned so as to link the chambers of jack 115 with the servovalve 222 across a double passage portion 227 of the slide. The actuator is then able to operate either in the electrically active mode, or in the mechanically active mode.

The electrically active mode is activated if the solenoid valve 212 is activated. The mechanical control is then disengaged and immobilized and the electric control input 115a of the servovalve is controlled.

When the solenoid valve 212 is deactivated, either intentionally, or as a result of electrical failures as described hereinbefore, the mechanical control is coupled to the servovalve, by means of the clutch 232 and the servovalve supplies the chambers of the jack with a flow which is a function of the mechanical control input 115b, which consequently corresponds to the mechanically active mode.

In the envisaged application and by design, the servovalve is not simultaneously controlled by the mechanical control input and the electric control input.

FIG. 6 shows a variant of the invention, in which the control device is equipped with two or three mixed actuators. The actuators 110, 112 and 114 have in the illustrated embodiment, respectively electric control inputs 111a, 113a and 115a, connected to the electric control unit 127 and mechanical control inputs 111b, 113b, 115b connected to the linkage 124 by means of transmissions 325, 225 and 125 respectively.

The redundant character of this configuration provides a supplementary operating security.

FIG. 7 shows another variant of the invention, where only two actuators are used. The device has a mixed actuator 115 with an electric control input 115a connected to an electric control system 127 and a mechanical control input 115b connected to the pedals 126 by a linkage 124 and a transmission 125. The actuator 115 is supplied by a hydraulic circuit 300 pressurized from two different engines of the aircraft.

The second actuator carries the reference 109 and is an Electrical Back-up Hydraulic Actuator or EBHA with two electric inputs 109a, 109b also connected to the control system 127.

The electric input 109a makes it possible to supply control commands to a not shown, servovalve of the aforementioned type and supplied by a hydraulic circuit 302. The second electric input 109b supplies control commands to an integrated, autonomous, hydraulic generating system for the manipulation of the control surface.

In the case of a failure of one of the engines, the hydraulic circuit 300 remains pressurized by the second engine and the actuator 115 remains operational. Moreover, in the case of a failure of an engine leading to a pressure loss on the hydraulic circuit 302, the actuator 109 remains operational due to its integrated, hydraulic generating system then controlled on the input 109b.

Thus, these two actuators can operate the control surface in the case of a failure of one of the engines using the afore-described double electric/hydraulic supply for powering the actuators 109 and 115.

This embodiment economizes with respect to one actuator and possibly a hydraulic circuit, compared with the embodiment of FIG. 2. Thus, a significant weight gain can be obtained.

What is claimed is:

1. Device for control of an inclination or pitch control surface (116) of an aircraft, having at least two actuators (110, 112, 114), each actuator having at least one electric control input (111a, 113a, 115a), and an electric control system (127) for the actuators able to occupy a first state, the normal flight state, in which at least one of the actuators is controlled so as to actuate the control surface, characterized in that at least one of the actuators (114), referred to as the mixed actuator, also has a mechanical control input (115b), and in that the electric control system of the actuators is able to occupy a second state, the manoeuvre state, in which at least two of the actuators are controlled so as to simultaneously actuate the control surface (116), and a third state, called electric control failure state, in which the mixed actuator (114) is controlled from the mechanical control input in order to actuate the control surface.

2. Device according to claim 1, comprising an actuator with an electric control input and a mixed actuator with an electric control input and a mechanical control input.

3. Device according to claim 2, wherein the actuator with the electric control input is an electrically supplied hydrostatic actuator.

4. Device according to claim 2, wherein the actuator with the electrically controlled input is an actuator with a double electric/hydraulic supply.

5. Device according to claim 1, comprising two actuators with an electric control input and a mixed actuator with an electric control input and a mechanical control input.

6. Process for controlling a control system of an aircraft inclination or pitch control surface (116), the control system comprising at least two actuators (110) with an electric control input, whereof at least one of the actuators, referred to as the mixed actuator (114), also has a mechanical control input (115b), and the control system further comprising an electric control system (127) for the actuators, wherein, for actuating the control surface, at least one of the actuators is electrically controlled in a normal flight state, at least two actuators can be electrically and simultaneously controlled in a manoeuvre state, and the mixed actuator (114) is mechanically controlled in a breakdown state of the actuators electric control system (127).

* * * * *